UNITED STATES PATENT OFFICE 2,553,584

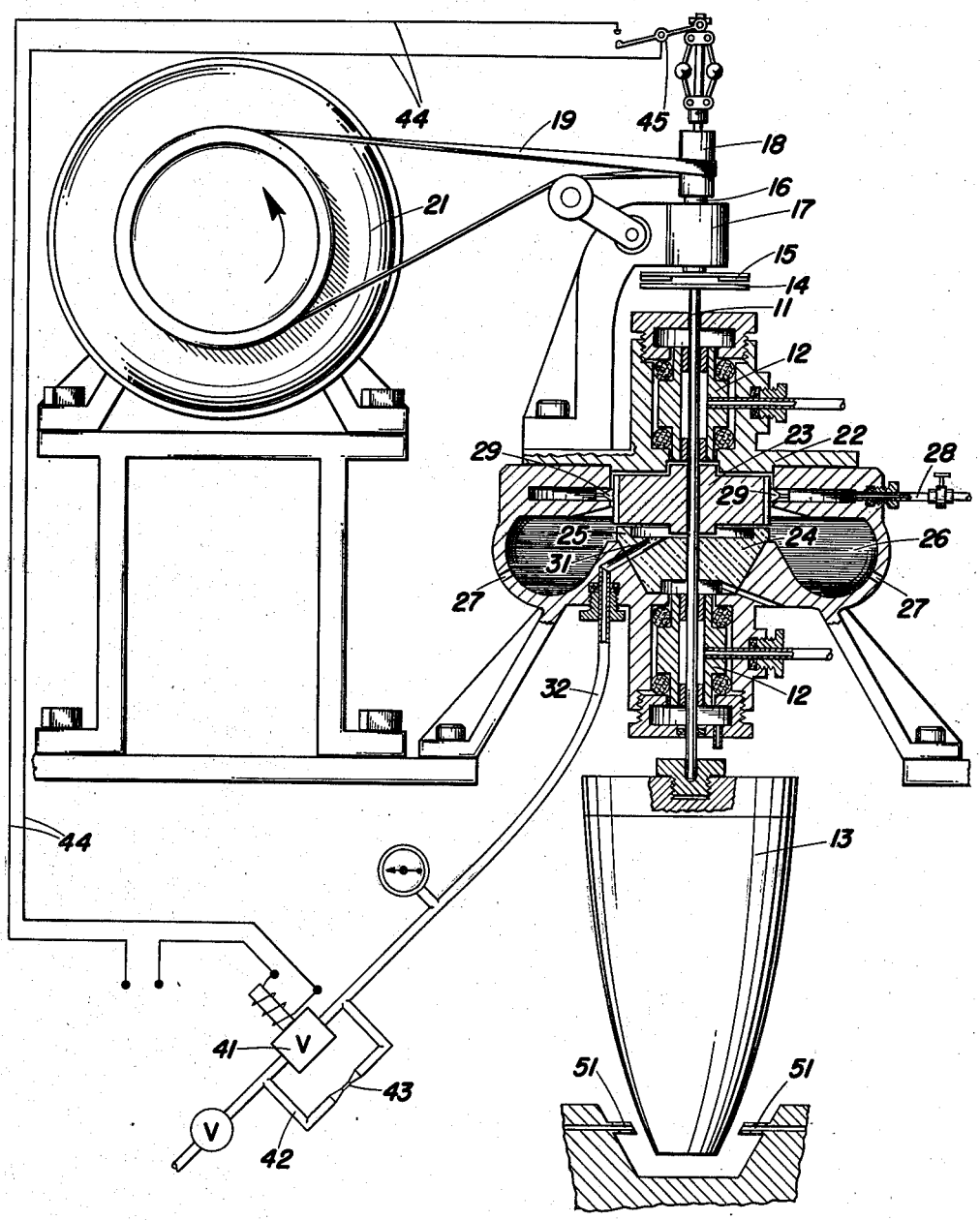

APPARATUS FOR RAPIDLY ACCELERATING A SHAFT

Joseph Hirsch, Port Hueneme, and John Onisko, Jr., Inyokern, Calif.

Application December 29, 1947, Serial No. 794,386

7 Claims. (Cl. 60—6)

(Granted under the act of March 3, 1883, as amended April 30, 1928; 370 O. G. 757)

This invention relates to centrifuges, and more particularly to centrifuges which must be accelerated to maximum speed in a very short time.

It is an object of this invention to provide apparatus and method for rapidly accelerating a centrifuge shaft from standstill position to its maximum rotative velocity.

It is another object of this invention to provide apparatus and method whereby two types of driving means may be utilized to accelerate and drive a centrifuge shaft.

It is another object of this invention to provide clutch means whereby one of a pair of driving means for a centrifuge shaft may be expeditiously and simply disconnected from the shaft when the speed of said one driving means reaches a maximum, thereby allowing the other driving means to continue the acceleration and driving of the centrifuge shaft.

It is a further object of this invention to provide improved means for cutching and declutching a driving motor from a centrifuge shaft.

It is a still further object of this invention to provide an improved method for operating a clutch plate secured to a spinning centrifuge shaft.

In accordance with these objects, and with other objects which will become readily apparent in the following specification, means are provided for bringing a rotatively mounted shaft rapidly up to its maximum velocity. The instant invention will be described specifically as applied to centrifuges, although it will be readily understood that it may be equally applied to any apparatus having a rotatable shaft which must be rapidly accelerated from stand still position to the maximum velocity attainable.

The instant invention contemplates the employment of two types of driving means for the shaft, one of which is limited by having a relatively low driving torque, particularly at low speed; the other of which, although having high torque at low speed, is limited by having a relatively low maximum speed, so that if left connected to the shaft, it would definitely limit the maximum speed attainable by the shaft.

In accordance with this invention, the low speed, high torque driving means is first used as a principal source of accelerating power for the shaft up to approximately its maximum speed, at which point it is declutched or otherwise disengaged from its connection with the shaft, and the high speed driving means continues the acceleration and driving up to its maximum speed.

For the high torque, low speed driving means, there is employed, in accordance with the instant invention, a motor coupled through a clutch to the shaft to be driven. For the high speed driving means, there is employed a fluid turbine rotor secured to the shaft and driven by any suitable fluid, for example compressed air. While other fluids may be employed, compressed air has been found to be quite satisfactory, and the ensuing description will assume use of that gaseous medium, although it is to be understood that the invention is not limited to such a driving fluid.

The shaft is rotatably mounted in such a way as to permit limited axial sliding in its bearing. On the end of the shaft is a clutch plate or member, which is engaged, by axial movement of the shaft, with a corresponding driving clutch member connected to be driven by a motor. A turbine rotor is secured to the shaft, and the shaft is biased in one direction or the other. In a preferred embodiment of the invention the shaft is biased so that the clutch plates are disengaged. This biasing is accomplished by mounting the shaft vertically and allowing the force of gravity on the shaft and turbine rotor to bias the clutch to disengaged position. The clutch is caused to engage by the provision of an air conduit directed against the turbine rotor with an upward axial component, so that when the force of air issuing from the conduit is sufficiently strong, the shaft is pushed upwardly against gravity to close the clutch, thereby allowing the motor to assist in driving the shaft. A second air conduit is provided, directed tangentially against the rotor in the conventional manner, to spin the rotor and thereby drive the shaft.

In operation, when it is desired to accelerate the shaft from standstill air is applied to the rotor through both conduits. This starts the rotor spinning and also pushes the shaft upwardly to close the clutch and thereby allow the motor to assist in accelerating the shaft. When the shaft has reached such a speed that the motor becomes a handicap rather than an aid in driving, means are provided for automatically decreasing the flow of air through the axially directed conduit, so that the shaft drops and the clutch disengages, thereby allowing the air turbine alone to continue the acceleration and driving of the shaft up to its maximum speed.

One embodiment of the instant invention is shown in the accompanying drawing.

In the drawing, 11 designates a shaft vertically mounted in bearings 12, and carrying at the lower end thereof an object 13 which is to be spun. At its upper end the shaft 11 is provided with a clutch member or plate 14 with which is coaxially aligned a superior clutch plate 15 mounted on a shaft 16, journaled in a bearing 17. The shaft 16 is provided with a pulley wheel 18, driven by a belt 19 from motor 21, which is preferably, although not necessarily an electric motor.

A housing 22 surrounds the shaft between the bearings 12, and contains an air turbine rotor 23, fixedly secured to the shaft 11. The shaft 11 is mounted in the bearings 12 with limited axial movement depending upon the vertical clearance between the rotor 23 and the housing 22. The bottom portion of the housing 22 is formed of a base member 24, having a circumferential ridge 25, on which the rotor rests when the shaft is not spinning. Circumjacent the housing 22 is a generally toroidal chamber 26, communicating with the interior of the housing 22, and having outwardly directed exhaust outlets or vents 27. An air conduit 28 penetrates the walls of the housing 22, and terminates in a plurality of nozzles 29, directed generally tangentially against the rotor 23, so that when compressed air or other suitable fluid flows through the conduit 28 and jets from the nozzle 29, the rotor 23 is caused to spin, thereby rapidly rotating the shaft 11 and the object 13. The rotor 23 is lifted from the circumferential ridge 25 by an air jet issuing from a nozzle 31 fed from a conduit 32. This jet absorbs the downward thrust of gravity on the rotor 23 and connected parts, and allows it to be rotated freely by the air jet from the conduit 28.

The air jet from the nozzle 31 is directed against the underside of the rotor 23 with an upward axial component of velocity, which may be made sufficiently strong to lift the shaft, not only enough to clear to rotor 23 from the ridge 25, but also to engage the clutch plates 14 and 15, and thereby connect the driving motor 21 with the shaft 11.

Control of the air flow through conduit 32 is effected by a valve 41, interposed therein. A by-pass conduit 42, having a restriction 43, is shunted around the valve 41. With the valve 41 closed, the by-pass conduit 42 with its restriction 43, serves to pass just enough air to lift the rotor 23 from the ridge 25, but not to close the gap between the clutch plates 14 and 15. Valve 41 is preferably electrically actuable, so that it may be controlled in accordance with an electric voltage or signal introduced through the wires 44, fed from any suitable speed responsive, electric device 45, driven by the shaft 16 and mounted thereabove. The speed responsive means 45 is designed to produce a suitable electric signal for actuating the valve 41 through the wires 44 to closed position whenever the speed of shaft 11, and hence of shaft 16, rises to a predetermined value representing approximately the speed at which the motor 21 is no longer able to contribute to the acceleration of the shaft 11, but becomes instead a load on the driving turbine 23. With valve 41 open, air flow in conduit 32 is sufficient to engage the clutch plates 14 and 15, thereby coupling the motor 21 to the shaft 11. With the valve 41 closed, the flow of air in conduit 32 must pass through the restriction 43, and is thereby decreased in volume to the point where the turbine rotor 23 is held just above the circumferential ridge 25, but is not held high enough to engage the clutch plates 14 and 15.

In order to prevent eccentricity in the spin of the object 13, inwardly directed radial air jets may be applied evenly around the object 13 by means of air nozzles 51.

*Operation*

The operation of the accelerating apparatus of this invention is substantially as follows.

After an object 13 to be rapidly spun has been attached to the shaft 11, air under pressure is admitted from suitable sources to the conduits 28 and 32. At this time the valve 41 is in open position, so that the rate of air flow from the nozzle 31, directed upwardly against the rotor 23, is sufficient to lift the shaft and engage clutch plates 14 and 15, thereby coupling the motor 21 to the shaft 11. The motor 21 is simultaneously energized, and the shaft 11 commences to accelerate. When the speed of the shaft 11, and of the shaft 17 coupled thereto, has attained a predetermined value, which is approximately the maximum speed attainable by the motor 21, the speed responsive mechanism 45 delivers an electric signal to the valve 41, thereby closing the valve. The restricted flow of air through the by-pass 42 is enabled only to maintain the rotor 23 clear of the ridge 25, allowing the clutch plates 14 and 15 to disengage. At this point the air from the nozzle 29, which has not been particularly effective heretofore, now assumes the full driving load and continues the acceleration of the shaft 11 to the maximum speed attainable by the turbine rotor 23, which is well above the speed of the motor 21. Air flowing into the interior of the housing 22 both from conduits 28 and 32, after being expended against the turbine rotor 23, exhausts to the exhaust chamber 26, and is vented to the atmosphere through the outlets 27.

From the above description it will be seen that there has been described apparatus and method for rapidly accelerating a shaft to its maximum velocity, said means taking advantage of the high torque obtainable from an electric motor, while, at the same time, not being limited by the relatively low maximum speed attainable from such an electric motor.

It is not necessarily required that the air from the conduit 28 be applied from the outset to the rotor 23, although it is preferred to do so since it aids slightly in starting the shaft 11 and, in any event is not disadvantageous. It will also be understood that, if desired, the air flow through the conduit 32 may be decreased by manual means, rather than through the automatic means 45. It will be further understood that the air regulating means, instead of being in the form of a valve 41 and a separate by-pass conduit 42, may be constituted by a single valve which is regulated between a full open position and a partially closed position, which, in itself, constitutes a restriction in place of the separate restriction 43.

It will be understood that this invention may be designed and utilized in any suitable shape, size, or arrangement, depending upon the objects to be accomplished, and that various changes and modifications may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A centrifuge comprising a shaft mounted for high speed rotation and axially shiftable in its mounting, a fluid turbine rotor secured on said shaft, a clutch operable by shifting of said shaft and including a driven clutch member connected to said shaft and a driving clutch member facing said driven member, a motor connected to rotate said driving member, a fluid conduit disposed to direct fluid against said rotor substantially tangentially, thereby to rotate said shaft, and fluid flow means directed against said turbine rotor to shift said shaft and operate said clutch to engage and disengage said motor from said shaft.

2. A centrifuge comprising a shaft mounted for high speed rotation and axially shiftable in its mounting, a fluid turbine rotor secured on said shaft, a clutch operable by shifting of said shaft and including a driven clutch member connected to said shaft and a driving clutch member facing said driven member, a motor connected to rotate said driving member, a first conduit disposed to direct fluid against said rotor with an axial component of velocity whereby to shift said shaft and operate said clutch, a second conduit disposed to direct fluid against said rotor substantially tangentially, thereby to rotate said shaft, and a valve in said first conduit effective to control axial fluid velocity against said rotor and thereby to actuate said clutch.

3. A centrifuge comprising a shaft mounted for high speed rotation and axially shiftable in its mounting, said shaft being biased in a given axial direction, a fluid turbine rotor secured on said shaft, a clutch including a driven clutch member on one end of said shaft and a driving clutch member facing said driven member, a motor connected to rotate said driving member, a first conduit disposed to direct fluid against said rotor with an axial component of velocity whereby to shift said shaft against its bias and operate said clutch, a second conduit disposed to direct fluid against said rotor substantially tangentially, thereby to rotate said shaft, and a valve in said first conduit effective to control axial fluid velocity against said rotor and thereby to actuate said clutch.

4. A centrifuge comprising a shaft mounted for high speed rotation and axially shiftable in its mounting, said shaft being biased in a given axial direction, a fluid turbine rotor secured on said shaft, a housing surrounding said rotor, a clutch including a driven clutch member on one end of said shaft and a driving clutch member facing said driven member, a motor connected to rotate said driving member, a first conduit in said housing disposed to direct fluid against said rotor with an axial component of velocity whereby to shift said shaft against its bias and operate said clutch, a second conduit in said housing disposed to direct fluid against said rotor substantially tangentially, thereby to rotate said shaft, an exhaust chamber communicating with the interior of said housing and disposed to receive expended fluid from both said conduits, and a valve in said first conduit effective to control axial fluid velocity against said rotor and thereby to actuate said clutch.

5. A centrifuge comprising a shaft mounted for high speed rotation and axially shiftable in its mounting, said shaft being biased in a given axial direction, a fluid turbine rotor secured on said shaft, a housing surrounding said rotor, a clutch including a driven clutch member on one end of said shaft and a driving clutch member facing said driven member, a motor connected to rotate said driving member, a first conduit in said housing disposed to direct fluid against said rotor with an axial component of velocity whereby to shift said shaft against its bias and operate said clutch, a second conduit in said housing disposed to direct fluid against said rotor substantially tangentially, thereby to rotate said shaft, an exhaust chamber communicating with the interior of said housing and disposed to receive expended fluid from both said conduits, a valve in said first conduit effective to control axial fluid velocity against said rotor and thereby to actuate said clutch, and means responsive to shaft speed to actuate said valve to cause declutching of said motor when the shaft speed has attained a predetermined value.

6. A centrifuge comprising a shaft mounted for high speed rotation and axially shiftable in its mounting, a fluid turbine rotor secured on said shaft, a clutch operable by shifting of said shaft and including a driven clutch member connected to said shaft and a driving clutch member facing said driven member, a motor connected to rotate said driving member, a first conduit disposed to direct fluid against said rotor with an axial component of velocity whereby to shift said shaft and operate said clutch, a second conduit disposed to direct fluid against said rotor substantially tangentially, thereby to rotate said shaft, a valve in said first conduit effective to control axial fluid velocity against said rotor and thereby to actuate said clutch, and means responsive to shaft speed to actuate said valve to cause declutching of said motor when the shaft speed has attained a predetermined value.

7. A centrifuge comprising a shaft vertically mounted for rotation and limited axial displacement, a turbine rotor secured to said shaft, a driven clutch disc on the upper end of said shaft, a coaxially mounted driving clutch disc facing said driven disc from above, a motor connected to rotate said driving disc, a housing mounted around said rotor, a first fluid conduit penetrating said housing and terminating in a nozzle directed upwardly against said rotor for absorbing the downward thrust of gravity on the shaft and for raising said shaft to engage said discs and the parts connected thereto, a second fluid conduit penetrating said housing and terminating in a nozzle directed substantially tangentially against said rotor for rotating it, a generally toroidal exhaust chamber surrounding and communicating with said housing to receive expended fluid from both said conduits, said chamber being vented to atmosphere, a valve in said first conduit openable to engage said clutch discs by raising said shaft thru increase in flow of the upwardly directed fluid stream, and means responsive to shaft speed for closing said valve to disengage said discs when shaft speed has attained a predetermined value.

JOSEPH HIRSCH.
JOHN ONISKO, Jr.

(References on following page)

REFERENCES CITED

The following references are of record in the file of this patent:

UNITED STATES PATENTS

| Number | Name | Date |
|---|---|---|
| 471,694 | Gulden | Mar. 29, 1892 |
| 594,462 | Cook | Nov. 30, 1897 |
| 1,044,049 | Hine | Nov. 12, 1912 |
| 1,138,099 | Fornaca | May 4, 1915 |
| 1,254,951 | Ward | Jan. 29, 1918 |
| 1,608,778 | Dunwoodie | Nov. 30, 1926 |
| 1,752,862 | Strezynski | Apr. 1, 1930 |
| 1,962,942 | Seeley | June 12, 1934 |
| 2,123,219 | Waseige | July 12, 1938 |
| 2,181,741 | Rosch | Nov. 28, 1939 |
| 2,195,778 | Hill | Apr. 2, 1940 |
| 2,197,179 | Hersey | Apr. 16, 1940 |
| 2,265,929 | Ring | Dec. 9, 1941 |
| 2,342,055 | Laboulais | Feb. 15, 1944 |

FOREIGN PATENTS

| Number | Country | Date |
|---|---|---|
| 159,911 | Great Britain | Mar. 17, 1921 |
| 319,921 | Italy | July 26, 1934 |